(12) United States Patent
Suto

(10) Patent No.: US 11,167,694 B2
(45) Date of Patent: Nov. 9, 2021

(54) VEHICLE DOOR MIRROR WITH A SEALING LIP PART

(71) Applicant: Mitsuba Corporation, Gunma (JP)

(72) Inventor: Yukinori Suto, Kiryu (JP)

(73) Assignee: Mitsuba Corporation, Gunma (JP)

( * ) Notice: Subject to any disclaimer, the term of this patent is extended or adjusted under 35 U.S.C. 154(b) by 260 days.

(21) Appl. No.: 16/475,829

(22) PCT Filed: Jan. 5, 2018

(86) PCT No.: PCT/JP2018/000079
§ 371 (c)(1),
(2) Date: Jul. 3, 2019

(87) PCT Pub. No.: WO2018/131540
PCT Pub. Date: Jul. 19, 2018

(65) Prior Publication Data
US 2019/0351825 A1  Nov. 21, 2019

(30) Foreign Application Priority Data

Jan. 10, 2017 (JP) .............................. JP2017-001570

(51) Int. Cl.
*B60R 1/06* (2006.01)
(52) U.S. Cl.
CPC ...................................... *B60R 1/06* (2013.01)
(58) Field of Classification Search
None
See application file for complete search history.

(56) References Cited

U.S. PATENT DOCUMENTS

| | | | | |
|---|---|---|---|---|
| 2,459,720 A | * | 1/1949 | Poltorak | F16L 23/22 277/608 |
| 4,241,491 A | * | 12/1980 | Hopp | B21D 51/38 277/630 |
| 2001/0006279 A1 | * | 7/2001 | Sugimoto | F16J 15/0825 277/595 |

(Continued)

FOREIGN PATENT DOCUMENTS

| | | |
|---|---|---|
| JP | 2005178594 A | 7/2005 |
| JP | 2012153198 A | 8/2012 |

(Continued)

OTHER PUBLICATIONS

European Patent Office, Search Report issued in EP 18739119.8 dated Aug. 21, 2020.

(Continued)

*Primary Examiner* — Jennifer D. Carruth
(74) *Attorney, Agent, or Firm* — Wood Herron & Evans LLP

(57) ABSTRACT

A stay packing (12) includes a plate-shaped packing main body (31) formed to correspond to a stay attachment surface (22), and a lip part (35) formed in an annular shape along an outer peripheral portion of the packing main body (31) and formed to protrude from the packing main body (31) toward an outer panel, in which the lip part (35) includes two flexion parts (54*a*) and (54*b*) between a base, which is a portion connected to the packing main body (31), and a distal end thereof, and the flexion parts (54*a*) and (54*b*) are formed over the entire circumference of the lip part (35).

3 Claims, 6 Drawing Sheets

(56) References Cited

U.S. PATENT DOCUMENTS

| | | | | |
|---|---|---|---|---|
| 2004/0066124 | A1* | 4/2004 | Kanao | H01T 13/08 |
| | | | | 313/135 |
| 2004/0104539 | A1* | 6/2004 | Nakazawa | B60R 1/06 |
| | | | | 277/637 |
| 2005/0262879 | A1* | 12/2005 | Kim | D06F 37/266 |
| | | | | 68/3 R |
| 2006/0132943 | A1* | 6/2006 | Suzuki | B60R 1/10 |
| | | | | 359/879 |
| 2012/0188662 | A1* | 7/2012 | Hamada | B60R 1/06 |
| | | | | 359/871 |
| 2019/0193636 | A1* | 6/2019 | Sawada | F16J 15/3204 |
| 2020/0276890 | A1* | 9/2020 | Kimura | B60J 5/04 |
| 2020/0339198 | A1* | 10/2020 | Takahashi | B62D 25/04 |

FOREIGN PATENT DOCUMENTS

| | | |
|---|---|---|
| JP | 5377530 B2 | 12/2013 |
| JP | 2014172515 A | 9/2014 |
| JP | 5653773 B2 | 1/2015 |
| JP | 5798385 B2 | 10/2015 |

OTHER PUBLICATIONS

PCT Office, International Search Report issued in corresponding PCT/JP2018/000079 dated Feb. 13, 2018, 2 pages.

* cited by examiner

VEHICLE DOOR MIRROR WITH A SEALING LIP PART

TECHNICAL FIELD

The present invention relates to a door mirror.

BACKGROUND ART

Generally, when a door mirror is fixed to a vehicle body, a structure in which a stay of the door mirror is fastened and fixed by bolts from the inside of the vehicle body is employed in many cases. Here, a packing (gasket) for securing sealing is provided between the vehicle body and the door mirror. When the bolts are fastened, the packing is compressively deformed and thereby the packing and the vehicle body, and the packing and the stay are brought into close contact with each other. As a result, sealing between the vehicle body and the door mirror is secured (for example, see Patent Document 1, Patent Document 2, and Patent Document 3).

Here, a technology in which a portion of the packing being compressively deformed is made into a lip part so that the compressive deformation is facilitated, thereby facilitating the packing and the vehicle body, and the packing and the stay being brought into close contact with each other has been disclosed (for example, see Patent Document 4).

According to Patent Document 4, the lip part is formed in an annular shape along an outer peripheral surface of the packing. The lip part extends to gradually increase in diameter toward a distal end thereof. A cross-sectional area of the lip part is formed to gradually increase from a center in a longitudinal direction toward opposite ends in the longitudinal direction. When the lip part configured as described above is pressed against the vehicle body, the lip part is elastically deformed and a distal end side thereof collapses to increase the diameter. A restoring force is applied to the lip part. Therefore, adhesion between the vehicle body and the lip part is enhanced.

CITATION LIST

Patent Literature

[Patent Document 1]
   Japanese Patent No. 5377530
[Patent Document 2]
   Japanese Patent No. 5653773
[Patent Document 3]
   Japanese Patent No. 5798385
[Patent Document 4]
   Japanese Patent Application, Publication No. 2014-172515

SUMMARY OF INVENTION

Technical Problem

Incidentally, since a clearance between an attachment surface of a stay to a vehicle body and the vehicle body is irregular around the entire circumference of the stay, in the above-described Patent Document 4, the amount of collapse of the lip part differs depending on a portion. In order to improve adhesion between the vehicle body and the lip part, since it is desirable that the lip part be inclined over the entire circumference to be brought into close contact with the vehicle body, an inclination space of the lip part needs to be secured assuming a case in which the lip part greatly collapses. That is, it is necessary to set a base of the lip part at a portion deep inside in a radial direction from an outer peripheral edge of the packing. With the configuration as described above, from the perspective of exterior appearance, a gap between the vehicle body and the stay appears to be open to a large degree, and there is a likelihood of deteriorating the design quality.

It is also conceivable that the base of such a lip part be disposed at a position close to the outer peripheral edge of the packing. However, in such a case, when the lip part is pressed against the vehicle body and the lip part is elastically deformed, a distal end of the lip part protrudes from the outer peripheral portion of the stay, and there is a likelihood of causing deterioration in design quality.

The present invention provides a door mirror in which the design quality is able to be enhanced while reliable sealing with respect to a vehicle body is able to be secured.

Solution to Problem

A door mirror according to the present invention includes a door mirror main body, an attachment stay including an attachment surface attached to a vehicle body by being brought into contact therewith and configured to attach the door mirror main body to the vehicle body, and a seal part provided between the attachment stay and the vehicle body, in which the seal part includes a plate-shaped seal main body formed to correspond to the attachment surface and a lip part formed in an annular shape along an outer peripheral portion of the seal main body and formed to protrude from the seal main body toward the vehicle body, and the lip part includes at least two flexion parts between a base, which is a portion connected to the seal main body, and a distal end thereof, and the flexion parts are formed over the entire circumference of the lip part.

As described above, the lip part has substantially a serpentine shape due to at least two flexion parts provided between the base and the distal end of the lip part. Therefore, when the lip part is pressed against the vehicle body to elastically deform the lip part, a space of the lip part can be set to be small by actively folding the flexion part. According to that amount, the lip part can be disposed at a position close to an outer peripheral edge of the seal main body. As a result, a gap between the vehicle body and the attachment surface of the attachment stay can be buried as much as possible by the lip part. Therefore, design quality of the door mirror can be enhanced while reliable sealing between the attachment stay and the vehicle body is secured.

In the door mirror according to the present invention, the lip part may include a first extended part having a first flexion part formed at the base and extending from the first flexion part while gradually increasing in diameter, and a second extended part extending from a distal end of the first extended part via a second flexion part while gradually decreasing in diameter.

With such a configuration, the gap between the vehicle body and the attachment surface of the attachment stay can be effectively buried by the lip part while reducing the number of flexion parts as much as possible. Also, reliable sealing between the attachment stay and the vehicle body can be secured.

In the door mirror according to the present invention, a ridge part protruding toward the vehicle body along an outer peripheral edge of the attachment surface may be provided, and the base of the lip part may be disposed at a position facing the ridge part.

With such a configuration, the rigidity of the attachment surface can be enhanced by the ridge part. Also, due to the ridge part having high rigidity, the base of the lip part can be reliably pressed toward the vehicle body. Therefore, when the seal part (lip part) is compressively deformed, the seal main body can be prevented from being twisted.

In the door mirror according to the present invention, the seal main body may include an annular stay mounting part protruding from the seal main body toward a side opposite to the lip part to cover an outer peripheral surface of the attachment surface, and the base of the lip part may be disposed close to the stay mounting part.

As described above, rigidity of the seal main body can be increased by forming the stay mounting part. Due to the base of the lip part disposed close to the stay mounting part, the base of the lip part is disposed at a portion at which the seal main body does not readily deform. Therefore, when the seal part (lip part) is compressively deformed, the seal main body can be prevented from being twisted.

Advantageous Effects of Invention

According to the present invention, the lip part has substantially a serpentine shape due to at least two flexion parts provided between the base and the distal end of the lip part. Therefore, when the lip part is pressed against the vehicle body to elastically deform the lip part, a space of the lip part can be set to be small by actively folding the flexion part. Then, according to that amount, the lip part can be disposed at a position close to the outer peripheral edge of the seal main body. As a result, the gap between the vehicle body and the attachment surface of the attachment stay can be buried as much as possible by the lip part. Therefore, the design quality of the door mirror can be enhanced while reliable sealing between the attachment stay and the vehicle body is secured.

DESCRIPTION OF EMBODIMENTS

Hereinafter, an embodiment of the present invention will be described on the basis of the drawings.
(Vehicle body)

Next, an embodiment of the invention will be described on the basis of the drawings.

Figure 1:
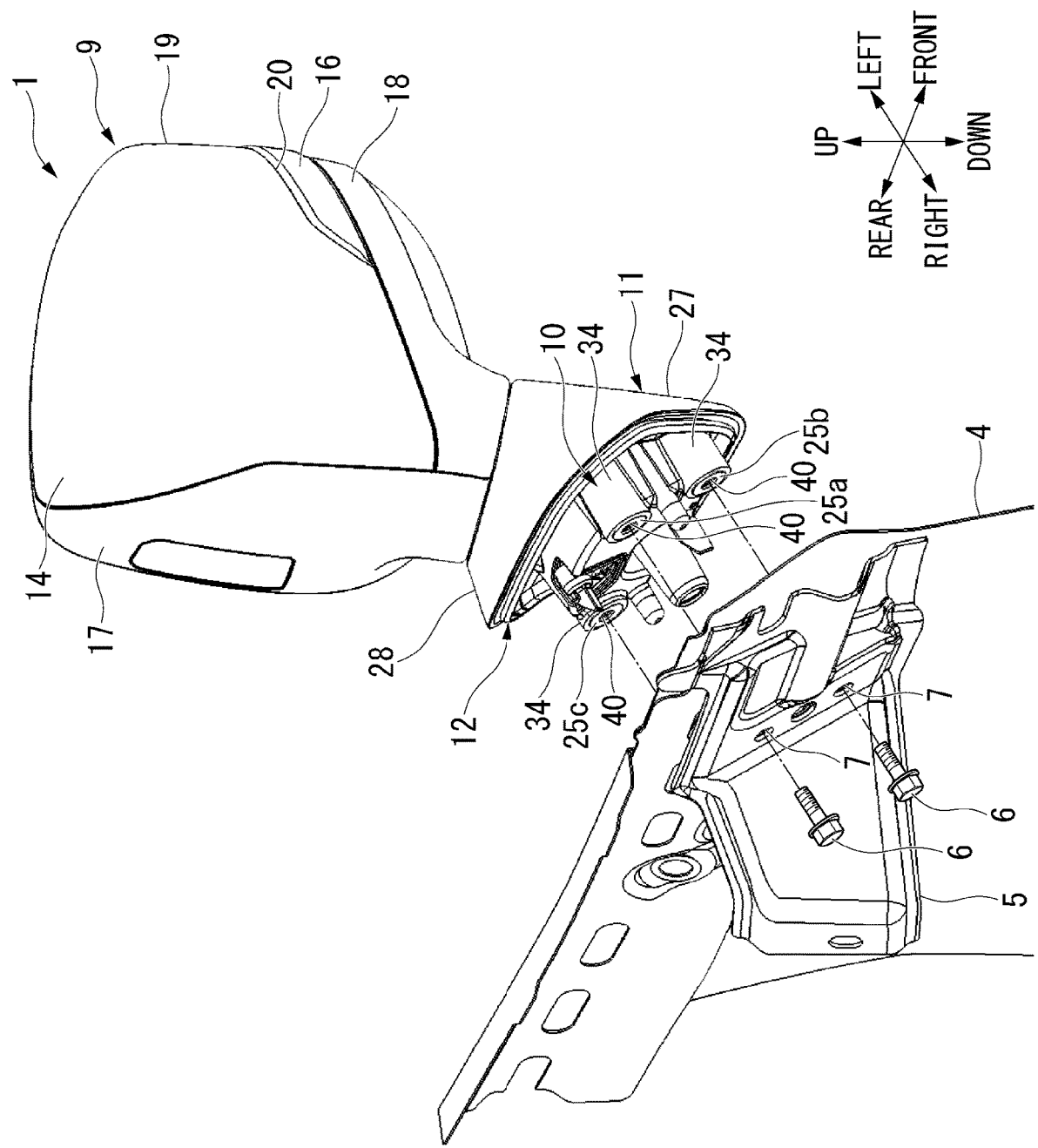
FIG. 1 is a perspective view of a door mirror of an embodiment of the present invention when viewed from the front in a traveling direction.

FIG. 1 is a perspective view of a door mirror 1 when viewed from the front in a traveling direction. In the following description, in order to simplify the explanation, there are cases in which the front in a traveling direction of a vehicle is referred to simply as the front, the rear in the traveling direction thereof is referred to simply as the rear, a vehicle width direction (horizontal direction) is referred to simply as a lateral direction, and up and down in a vertical direction of the vehicle is referred to simply as upward and downward, or the like.

As shown in FIG. 1, the door mirror 1 is attached to a front door 3 of a vehicle body 2. The front door 3 includes an outer panel 4, and an inner bracket 5 for attaching the door mirror 1 to the outer panel 4.

Insertion holes 7 through which bolts 6 can be inserted from the inside of the inner bracket 5 are formed in the inner bracket 5. Insertion holes (not shown) are formed also in the outer panel 4. The bolts 6 are inserted into the respective insertion holes 7 from the inside of the front door 3 and screwed into an attachment stay 10 of the door mirror 1. Thereby, the door mirror 1 is fastened and fixed to the front door 3 using the bolts 6.
(Door mirror)

Figure 2:
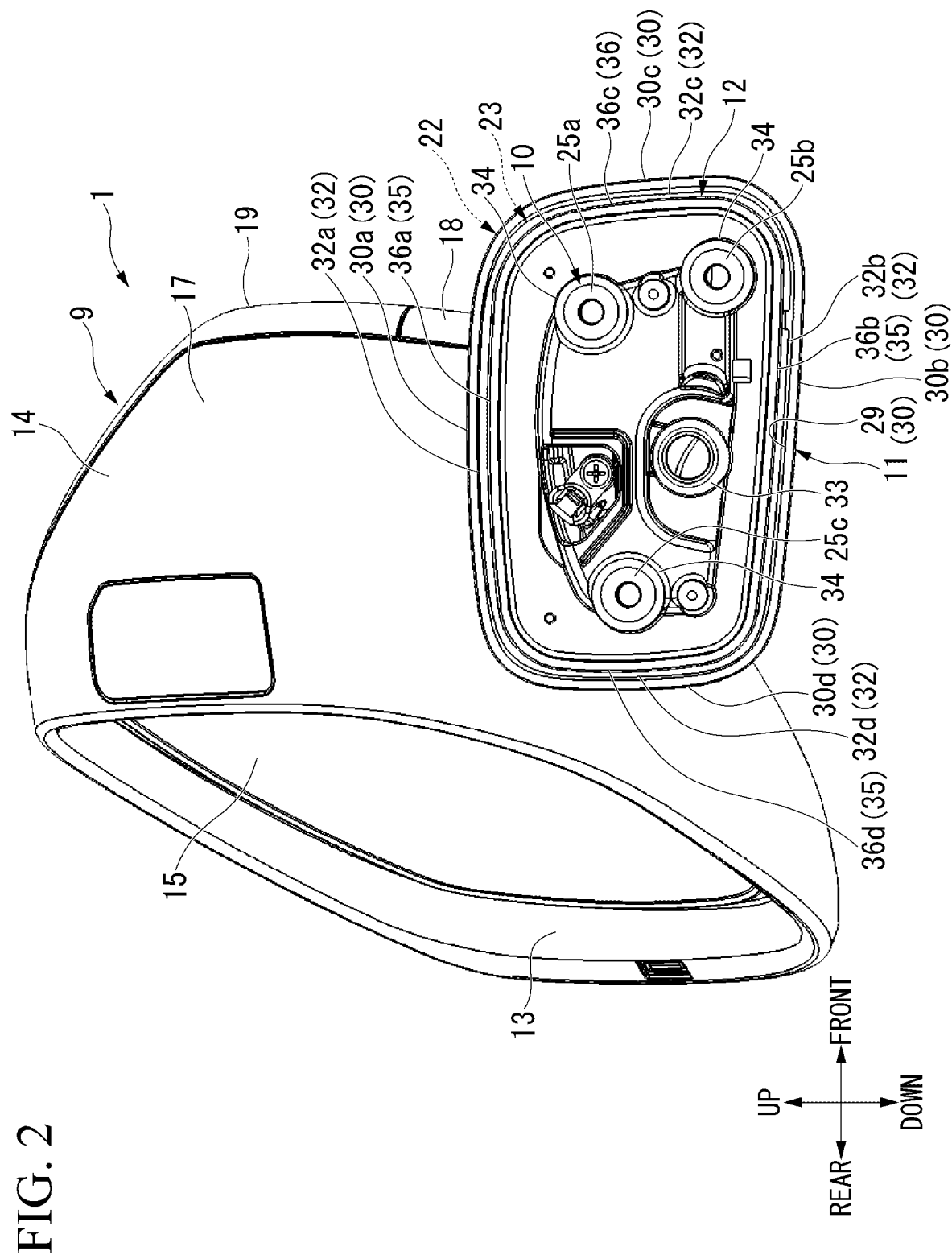
FIG. 2 is a perspective view of the door mirror of the embodiment of the present invention when viewed from a stay attachment surface side of an attachment stay.

FIG. 2 is a perspective view of the door mirror 1 when viewed from a stay attachment surface 22 side of the attachment stay 10.

As shown in FIGS. 1 and 2, the door mirror 1 includes a door mirror main body 9, the attachment stay 10 for attaching the door mirror main body 9 to the front door 3, a cover 11 which covers the attachment stay 10, and a stay packing 12 for securing sealing between the attachment stay 10 and the outer panel 4.

The external appearance of the door mirror main body 9 is configured by a mirror housing 14 having a mirror opening 13 facing the rear, a mirror 15 provided to close the mirror opening 13 and allowing to check behind the vehicle body 2, and a turn signal lamp 16 attached to a surface on the front side of the mirror housing 14.

An electric storage unit for tilting the mirror housing 14 by an operation switch (not shown) in the vehicle and a remote-control unit for adjusting a reflection angle of the mirror 15 (none of them is shown) are incorporated in the mirror housing 14. The mirror 15 is supported behind the remote-control unit.

The mirror housing 14 is molded of a resin or the like. The mirror housing 14 is constituted by a housing main body 17 having the mirror opening 13 formed therein, and a cover housing 18 and a skullcap 19 attached to a rear surface side thereof which is the front of the housing main body 17.

A notch part 20 is formed on an outer side in the vehicle width direction at a lower portion of the skullcap 19, and the turn signal lamp 16 is exposed from the notch part 20.

Figure 3:
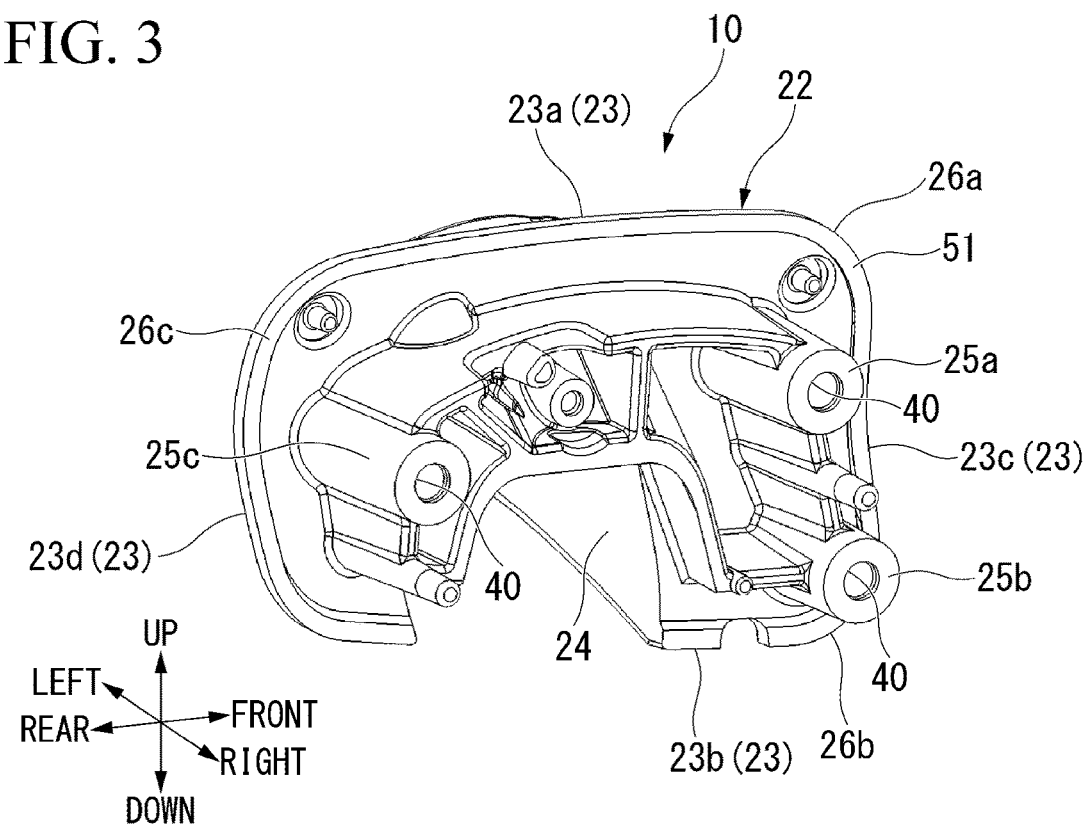
FIG. 3 is a perspective view of the attachment stay of the embodiment of the present invention.

FIG. 3 is a perspective view of the attachment stay 10.

As shown in FIGS. 2 and 3, a stay main body (not shown) extending obliquely downward from the door mirror main body 9 and the stay attachment surface 22 provided at a distal end of the stay main body and configured to be in contact with the outlet panel 4 via the stay packing 12 are integrally molded in the attachment stay 10.

The stay attachment surface 22 is formed in a plate shape and in substantially a rectangular shape to be longer in a front-rear direction in a plan view. A peripheral edge 23 of the stay attachment surface 22 is constituted by an upper portion straight side 23a and a lower portion straight side 23b facing each other in a vertical direction and extending in a front-rear direction, a front portion curved side 23c connecting a front end of the upper portion straight side 23a and a front end of the lower portion straight side 23b, and a rear portion curved side 23d connecting a rear end of the upper portion straight side 23a and a rear end of the lower portion straight side 23b. A ridge part 51 protruding toward the outer panel 4 (see FIG. 1) side is formed on the peripheral edge 23 of the stay attachment surface 22 configured as described above. The ridge part 51 enhances rigidity of the flat plate-like stay attachment surface 22. The ridge part 51 is formed over the entire circumference of the peripheral edge 23.

An opening 24 allowing communication between the stay attachment surface 22 and the inside of the door mirror main body 9 is formed at substantially a center in a longitudinal direction of the stay attachment surface 22. A lead wire (not shown) or the like for electrically connecting the electric storage unit or the remote-control unit of the door mirror main body 9 to a battery (not shown) inside the vehicle body 2 is wired in the opening 24.

A first attachment boss 25a and a second attachment boss 25b are formed to protrude toward the outer panel 4 (see FIG. 1) side in the front of the opening 24 in the stay attachment surface 22. Also, a third attachment boss 25c is formed to protrude toward the outer panel 4 side in the rear of the opening 24 in the stay attachment surface 22.

Female threaded portions 40 into which the bolts 6 can be screwed are provided in the respective attachment bosses 25a to 25c. The bolts 6 inserted from the inside of the inner bracket 5 into the insertion holes 7 of the inner bracket 5 and insertion holes (not shown) of the outer panel 4 are screwed into the three attachment bosses 25a to 25c. Thereby, the door mirror 1 is fastened and fixed to the front door 3.

The first attachment boss 25a and the second attachment boss 25b are disposed to be aligned in the vertical direction. As described above, the first attachment boss 25a is disposed in the vicinity of the connecting part 26a between the upper portion straight side 23a and the front portion curved side 23c, and the second attachment boss 25b is disposed in the vicinity of the connecting part 26b between the lower portion straight side 23b and the front portion curved side 23c. The third attachment boss 25c is disposed in the vicinity of the connecting part 26c between the upper portion straight side 23a and the rear portion curved side 23d.

The attachment stay 10 configured as described above is covered by the cover 11.

As shown in FIG. 1, the cover 11 is configured to be divided into a lower cover 27 covering a lower portion of the attachment stay 10 and an upper cover 28 covering an upper portion of the attachment stay 10. The lower cover 27 and upper cover 28 are formed to extend between the door mirror main body 9 and the outer panel 4 and are each formed in a substantially U-shaped cross section. When the lower cover 27 and the upper cover 28 are superimposed on each other in the vertical direction, a closed cross-sectional structure is formed. A stay main body 21 of the attachment stay 10 is accommodated in this closed cross-sectional structure.

As shown in FIG. 2, a peripheral edge 30 of an opening 29 on the outer panel 4 side formed by the lower cover 27 and the upper cover 28 is formed in substantially a rectangular shape to correspond to the peripheral edge 23 of the stay attachment surface 22 and to surround a periphery of the peripheral edge 23.

That is, the peripheral edge 30 of the opening 29 is constituted by an upper portion straight side 30a and a lower portion straight side 30b facing each other in the vertical direction and extending in the front-rear direction, a front portion curved side 30c connecting a front end of the upper portion straight side 30a and a front end of the lower portion straight side 30b, and a rear portion curved side 30d connecting a rear end of the upper portion straight side 30a and a rear end of the lower portion straight side 30b.

The opening 29 configured as described above is formed such that the peripheral edge 30 is positioned on the same plane as the stay attachment surface 22. Thus, the stay packing 12 is provided to close the opening 29

(Stay Packing)

Figure 4:
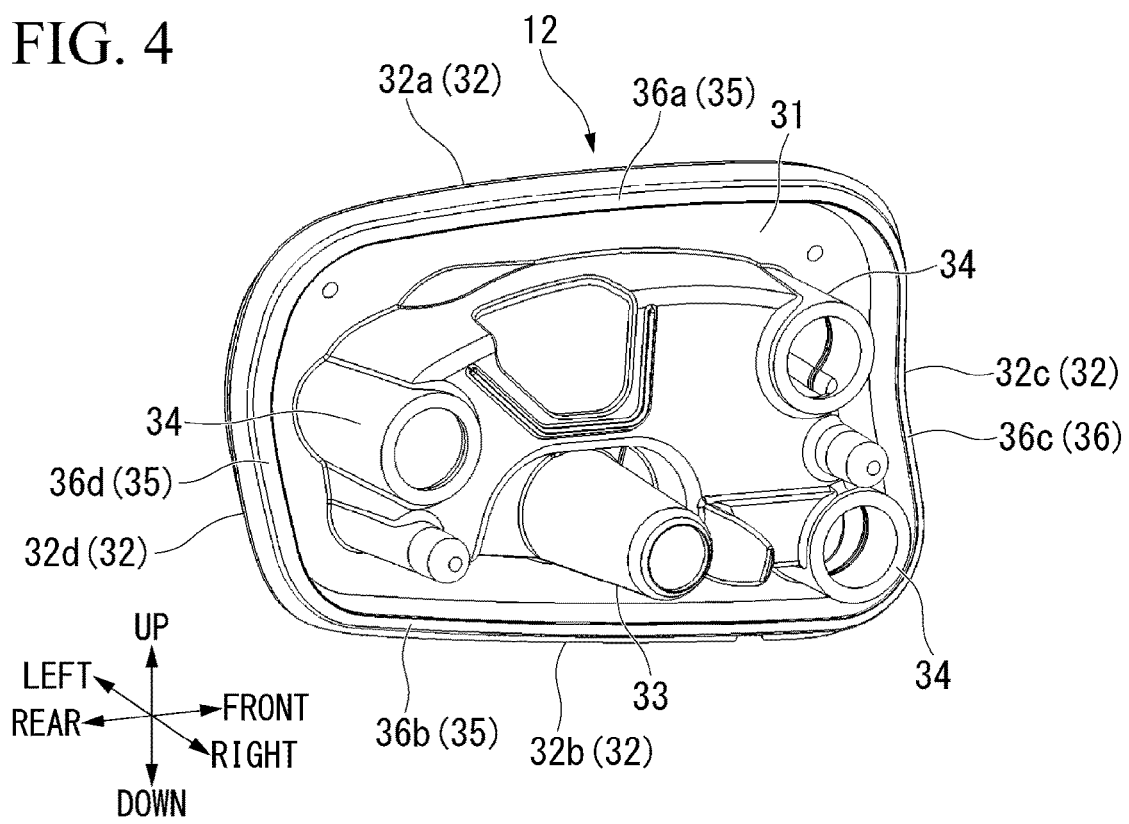
FIG. 4 is a perspective view of a stay packing of the embodiment of the present invention when viewed from an outer panel side.
Figure 5:
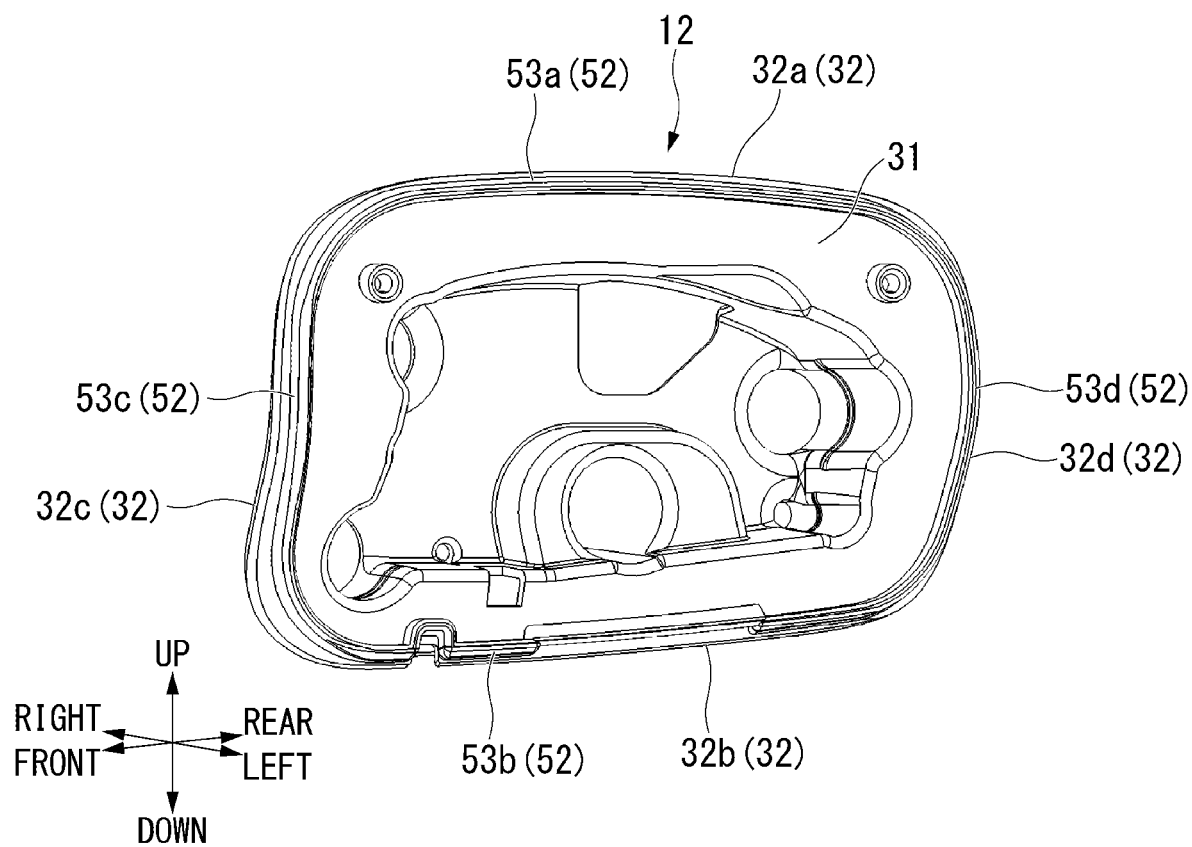
FIG. 5 is a perspective view of the stay packing of the embodiment of the present invention when viewed from the stay attachment surface side.
Figure 6:
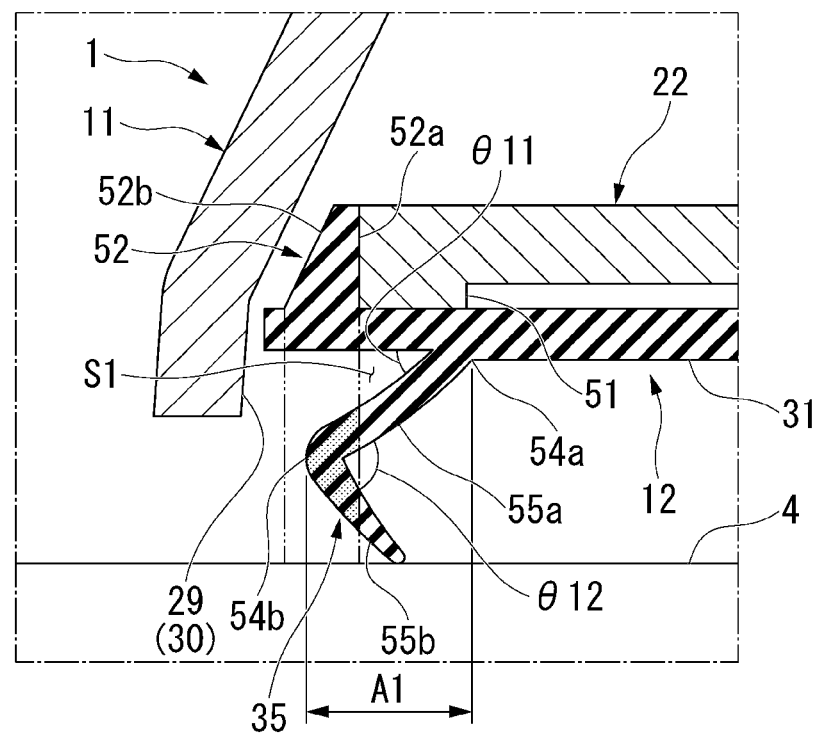
FIG. 6 is a schematic cross-sectional view showing a portion in a state in which the attachment stay is attached to the outer panel in the embodiment of the present invention.

FIG. 4 is a perspective view of the stay packing 12 when viewed from the outer panel 4 side. FIG. 5 is a perspective view of the stay packing 12 when viewed from the stay attachment surface 22 side. FIG. 6 is a schematic cross-sectional view showing a portion in a state in which the stay packing 12 is attached to the stay attachment surface 22 and the attachment stay 10 is attached to the outer panel 4.

As shown in FIGS. 4 to 6, the stay packing 12 may be formed of, for example, an elastic material such as an elastomer. The stay packing 12 includes a flat plate-like packing main body 31 provided to overlap the stay attachment surface 22 and to close the opening 29.

The packing main body 31 is formed in substantially a rectangular shape to be longer in the front-rear direction in a plan view to correspond to the stay attachment surface 22. A peripheral edge 32 of the packing main body 31 is constituted by an upper portion straight side 32a and a lower portion straight side 32b facing each other in the vertical direction and extending in the front-rear direction, a front portion curved side 32c connecting a front end of the upper portion straight side 32a and a front end of the lower portion straight side 32b, and a rear portion curved side 32d connecting a rear end of the upper portion straight side 32a and a rear end of the lower portion straight side 32b.

Also, a lead wire lead-out part 33 is formed to protrude toward the outer panel 4 side at a position corresponding to the opening 24 of the stay attachment surface 22 at a central portion of the packing main body 31. The lead wire lead-out part 33 guides a lead wire or the like for electrically connecting the electric storage unit or the remote-control unit (none of them is shown) of the door mirror main body 9 to the battery (not shown) inside the vehicle body 2 to the inside of the vehicle body 2. The lead wire lead-out part 33 is formed in substantially an annular shape of which a distal end is slightly tapered.

Boss packings 34 are formed to protrude toward the outer panel 4 side respectively at positions corresponding to the three attachment bosses 25a to 25c of the stay attachment surface 22 in the packing main body 31. The boss packings 34 are formed in substantially an annular shape to cover the peripheries of the attachment bosses 25a to 25c.

On a slightly inner side of the peripheral edge 32 of the packing main body 31, a stay mounting part 52 is formed to protrude toward the stay attachment surface 22 side. The stay mounting part 52 is formed to cover the peripheral edge 23 of the stay attachment surface 22 and the ridge part 51 and is externally fitted to the peripheral edge 23. A stay mounting part 52 is constituted by an upper portion straight mounting part 53a and a lower portion straight mounting part 53b facing each other in the vertical direction and extending in the front-rear direction, a front portion curved mounting part 53c connecting a front end of the upper portion straight mounting part 53a and a front end of the lower portion straight mounting part 53b, and a rear portion curved mounting part 53d connecting a rear end of the upper portion straight mounting part 53a and a rear end of the lower portion straight mounting part 53b.

The stay mounting part 52 (the upper portion straight mounting part 53a, the lower portion straight mounting part 53b, the front portion curved mounting part 53c, and the rear portion curved mounting part 53d) is formed to be tapered from a base, which is a connection portion with the packing main body 31, toward a distal end thereof. That is, as shown in FIG. 6, an inner peripheral surface 52a of the stay mounting part 52 extends substantially perpendicular to one surface 31a of the packing main body 31 on a side of the stay attachment surface 22 to follow the peripheral edge 23 of the stay attachment surface 22. An outer peripheral surface 52b of the stay mounting part 52 is inclined in a direction of decreasing in diameter from the base toward the distal end.

In the packing main body 31, a lip part 35 is formed to protrude toward the outer panel 4 side to surround peripheries of the three boss packings 34. The lip part 35 is formed such that a slightly inner side of the stay mounting part 52 of the packing main body 31 corresponds to a shape of the peripheral edge 32. In other words, a base of the lip part 35 is disposed at a position facing the ridge part 51 of the stay attachment surface 22 with the packing main body 31 interposed therebetween. In the lip part 35, the base is disposed close to the stay mounting part 52.

If the shape of the lip part 35 is described in detail, the lip part 35 is constituted by an upper portion straight lip part 36a and a lower portion straight lip part 36b facing each other in the vertical direction and extending in the front-rear direction, a front portion curved lip part 36c connecting a front end of the upper portion straight lip part 36a and a front end of the lower portion straight lip part 36b, and a rear portion curved lip part 36d connecting a rear end of the upper portion straight lip part 36a and a rear end of the lower portion straight lip part 36b.

The lip part 35 (the upper portion straight lip part 36a, the lower portion straight lip part 36b, the front portion curved lip part 36c, and the rear portion curved lip part 36d) includes two flexion parts 54a and 54b (a first flexion part 54a and a second flexion part 54b) formed over the entire circumference between the base, which is a connection portion with the packing main body 31, and a distal end thereof. The lip part 35 is formed in substantially a serpentine shape as a whole.

More specifically, the lip part 35 includes the first flexion part 54a provided at the base and configured to fold the lip part 35 with respect to the packing main body 31. The lip part 35 includes a first extended part 55a extending from the first flexion part 54a while gradually increasing in diameter and a second extended part 55b extending from a distal end of the first extended part 55a via the second flexion part 54b while gradually decreasing in diameter. The second flexion part 54b is positioned substantially in the middle of the lip part 35 in the protruding direction. A cross-sectional shape of the lip part 35 is formed to be gradually tapered from the first extended part 55a to the second extended part 55b.

(Action of Stay Packing)

Next, an action of the stay packing 12 will be described on the basis of FIGS. 6 to 8.

Figure 7:
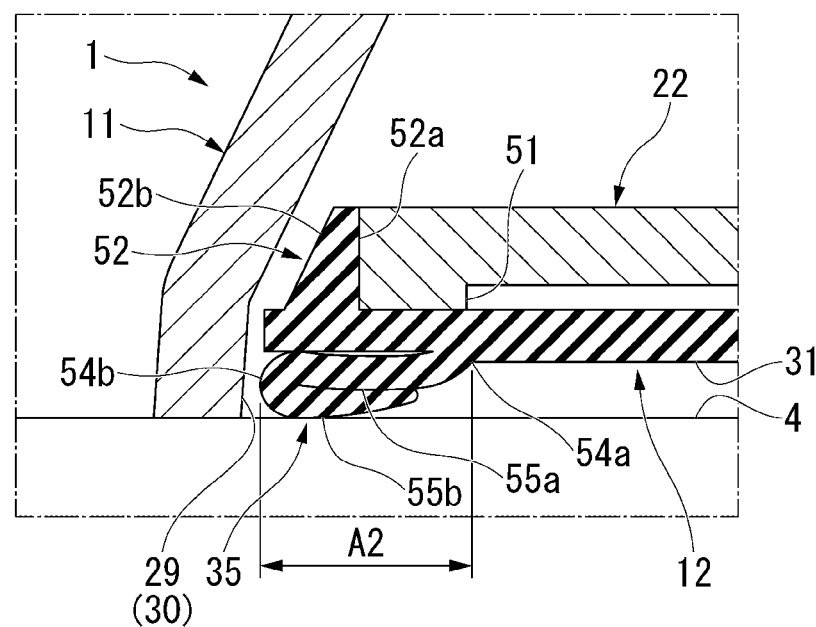
FIG. 7 is a schematic cross-sectional view showing a portion in a state in which the attachment stay is attached to the outer panel in the embodiment of the present invention.
Figure 8:
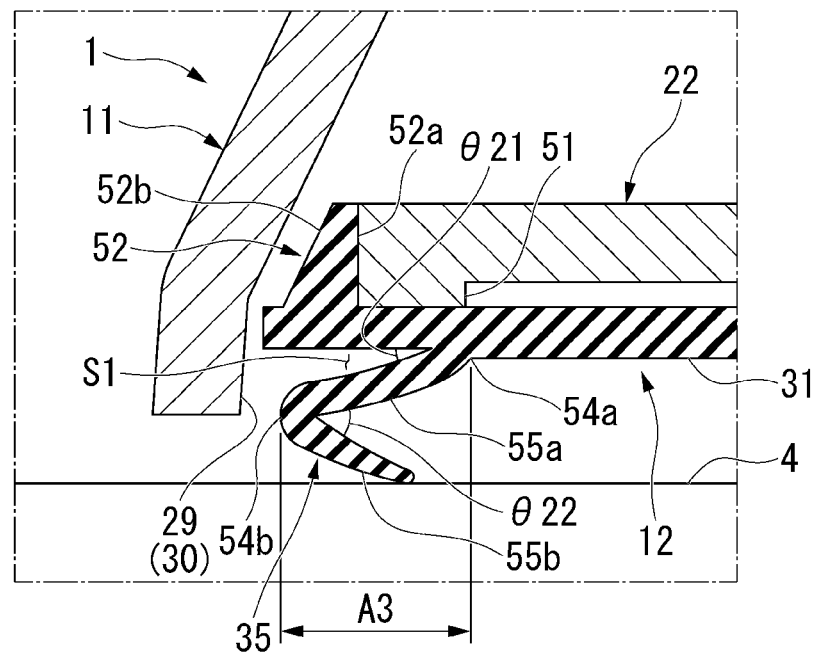
FIG. 8 is a schematic cross-sectional view showing a portion in a state in which the attachment stay is attached to the outer panel in the embodiment of the present invention.

FIGS. 7 and 8 are schematic cross-sectional views showing a portion in a state in which the attachment stay 10 is attached to the outer panel 4. Also, FIGS. 7 and 8 correspond to FIG. 6 described above.

Here, it is assumed that FIG. 6 shows a portion at which a clearance between the outer panel 4 and the stay attachment surface 22 is a maximum (hereinafter referred to as a maximum clearance portion) due to each of the parts having a large manufacturing error. It is assumed that FIG. 7 shows a portion at which a clearance between the outer panel 4 and the stay attachment surface 22 is a minimum (hereinafter, referred to as a minimum clearance portion). It is assumed that FIG. 8 shows a portion at which the clearance between the outer panel 4 and the stay attachment surface 22 is about an intermediate clearance between the maximum and the minimum (hereinafter referred to as an intermediate clearance portion) due to each of the parts having almost a central value in terms of a tolerance.

First, as shown in FIG. 6, the lip part 35 in the maximum clearance portion is formed to such an extent that it is slightly pressed and crushed. That is, folding angles θ11 and θ12 of the first flexion part 54a and the second flexion part 54b of the lip part 35 are large.

Here, the lip part 35 first extends from the base while increasing in diameter (the first extended part 55a), and then extends while gradually decreasing in diameter (the second extended part 55b). Then, the second flexion part 54b positioned substantially in the middle of the lip part 35 in the protruding direction has a shape protruding outward in the radial direction with respect to the base or the distal end of the lip part 35. Therefore, on the radial outer side of the lip part 35, a gap S1 between the packing main body 31 and the outer panel 4 is almost buried by the lip part 35.

Since the base of the lip part 35 is disposed at a position facing the ridge part 51 of the stay attachment surface 22 with the packing main body 31 interposed therebetween, the base of the lip part 35 is pressed by the ridge part 51. Therefore, when the lip part 35 is pressed and crushed, the packing main body 31 is prevented from being twisted. Also, the base of the lip part 35 is disposed close to the stay mounting part 52. More specifically, a portion of the lip part 35 wraps around the stay mounting part 52 in a lateral direction (see dotted hatching of the lip part 35 in FIG. 6). The portion of the packing main body 31 at which the stay mounting part 52 is disposed secures a thickness according to an extent to which the stay mounting part 52 is disposed, and thus does not readily deform. Since the base of the lip part 35 is disposed at the portion at which deformation does not readily occur, when the lip part 35 is pressed and crushed, the packing main body 31 is prevented from being twisted.

On the other hand, as shown in FIG. 7, the lip part 35 is completely pressed and crushed in the minimum clearance portion. That is, the first extended part 55a and the second extended part 55b are flexed to be folded. In this case, on the radial outer side of the lip part 35, the gap 51 between the packing main body 31 and the outer panel 4 is completely buried by the first extended part 55a and the second extended part 55b.

As shown in FIG. 8, the lip part 35 in the intermediate clearance portion is formed to such an extent that it is pressed and crushed slightly more than that in the maximum clearance portion. That is, folding angles θ21 and θ22 of the first flexion part 54a and the second flexion part 54b of the lip part 35 are small compared to the folding angles θ11 and θ12 (see FIG. 6) of the first flexion part 54a and the second flexion part 54b of the lip part 35 in the maximum clearance portion. In this case, the second flexion part 54b positioned substantially in the middle of the lip part 35 in the protruding direction has a shape protruding outward in the radial direction than that in the maximum clearance portion. Therefore, on the radial outer side of the lip part 35, the gap S1 between the packing main body 31 and the outer panel 4 is more buried by the lip part 35 than that in the maximum clearance portion.

Here, as shown in FIGS. 6 to 8, since the lip part 35 is formed in a serpentine shape, ranges A1 to A3 in which the lip part 35 is interposed are small in all cases of the maximum clearance portion (FIG. 6), the minimum clearance portion (FIG. 7), and the intermediate clearance portion (FIG. 8). Also, the size in the ranges A1 to A3 hardly changes.

Figure 9:
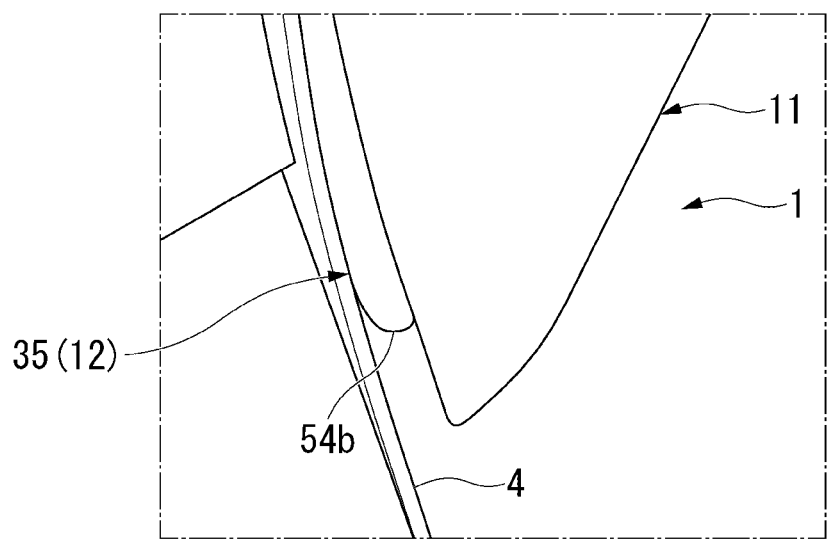
FIG. 9 is an external view in which a portion of a connection portion between the outer panel and the door mirror is enlarged in the embodiment of the present invention.

FIG. 9 is an external view in which a portion of the connection portion between the outer panel 4 and the door mirror 1 is enlarged.

As shown in FIG. 9, the lip part 35 is flexed so that the second flexion part 54b protrudes outward in the radial direction, and thereby the gap S1 between the packing main body 31 and the outer panel 4 is almost buried. Therefore, in external appearance, the gap between the outer panel 4 and the door mirror 1 does not appear to be widely open, and thereby the design quality is enhanced.

As described above, the lip part 35 of the above-described stay packing 12 includes the first flexion part 54a at the base. Further, the lip part 35 includes the first extended part 55a extending from the first flexion part 54a while gradually increasing in diameter and the second extended part 55b extending from the distal end of the first extended part 55a via the second flexion part 54b while gradually decreasing in diameter. The lip part 35 is formed in substantially a serpentine shape as a whole.

Therefore, when the lip part 35 is pressed and crushed, the ranges A1 to A3 (see FIGS. 6 to 8) in which the lip part 35 is interposed can be set to be small by actively folding the flexion parts 54a and 54b. According to that amount, the lip part 35 can be disposed at a position close to the peripheral edge 32 of the packing main body 31. As a result, the gap S1 between the outer panel 4 and the attachment stay 10 (the stay attachment surface 22) can be buried as much as possible by the lip part 35. Therefore, design quality of the door mirror 1 can be enhanced while reliable sealing between the outer panel 4 and the attachment stay 10 (the stay attachment surface 22) is secured.

Also, the base of the lip part 35 is disposed at a position facing the ridge part 51 of the stay attachment surface 22 with the packing main body 31 interposed therebetween. For this reason, the base of the lip part 35 is pressed by the ridge part 51. Therefore, when the lip part 35 is pressed and crushed, the packing main body 31 can be prevented from being twisted.

Further, the base of the lip part 35 is disposed close to the stay mounting part 52. A portion of the packing main body 31 at which the stay mounting part 52 is disposed secures a thickness according to an extent to which the stay mounting part 52 is disposed, and thus does not readily deform. The base of the lip part 35 is disposed at this portion at which deformation does not easily occur. Therefore, when the lip part 35 is pressed and crushed, the packing main body 31 can be prevented from being twisted.

The present invention is not limited to the above-described embodiment, and includes various modifications added to the above-described embodiment within a scope not deviating from the gist of the present invention.

For example, in the above-described embodiment, a case in which the stay attachment surface 22 is formed in a plate shape and in substantially a rectangular shape to be longer in a front-rear direction in a plan view has been described. Also, a case in which the packing main body 31 is formed in substantially a rectangular shape to be longer in the front-rear direction in a plan view to correspond to the stay attachment surface 22 has been described. However, the shape of the stay attachment surface 22 in a plan view can be an arbitrary shape. In this case, the shape of the packing main body 31 in a plan view is also made to correspond to the shape of the stay attachment surface 22.

Also, in the above-described embodiment, a case in which the lip part 35 (the upper portion straight lip part 36a, the lower portion straight lip part 36b, the front portion curved lip part 36c, and the rear portion curved lip part 36d) includes the two flexion parts 54a and 54b (the first flexion part 54a and the second flexion part 54b) formed over the entire circumference between the base, which is the connection portion with the packing main body 31, and the distal end, and is formed in substantially a serpentine shape as a whole has been described. However, the present invention is not limited thereto, and the lip part 35 need only be formed in substantially a serpentine shape as a whole. That is, the lip part 35 (the upper portion straight lip part 36a, the lower portion straight lip part 36b, the front portion curved lip part 36c, and the rear portion curved lip part 36d) need only include at least two flexion parts formed between the base, which is the connection portion with the packing main body 31, and the distal end, and two or more flexion parts may be provided.

Further, in the above-described embodiment, a case in which the stay packing 12 is formed of, for example, an elastomer has been described. However, the present invention is not limited thereto, and various elastic members that can be used as packing can be applied.

Also, in the above-described embodiment, a case in which the bolt 6 was used as the fixing member for attaching the door mirror 1 to the front door 3 has been described. However, the present invention is not limited thereto, and various fixing members can be applied.

INDUSTRIAL APPLICABILITY

According to the door mirror described above, the lip part has substantially a serpentine shape due to at least two flexion parts provided between the base and the distal end of the lip part. Therefore, when the lip part is pressed against the vehicle body to elastically deform the lip part, a space of the lip part can be set to be small by actively folding the flexion part. Then, according to that amount, the lip part can be disposed at a position close to the outer peripheral edge of the seal main body. As a result, the gap between the vehicle body and the attachment surface of the attachment stay can be buried as much as possible by the lip part. Therefore, design quality of the door mirror can be enhanced while reliable sealing between the attachment stay and the vehicle body is secured.

REFERENCE SIGNS LIST

1 Door mirror
2 Vehicle body
4 Outer panel (vehicle body)
9 Door mirror main body
10 Attachment stay
12 Stay packing (seal part)

22 Stay attachment surface (attachment surface)
31 Packing main body (seal main body)
32 Peripheral edge
35 Lip part
51 Ridge part
52 Stay mounting part
54a First flexion part (first flexion part)
54b Second flexion part (second flexion part)
55a First extended part
55b Second extended part

The invention claimed is:

1. A door mirror comprising:
a door mirror main body;
an attachment stay including an attachment surface attached to a vehicle body by being brought into contact therewith and configured to attach the door mirror main body to the vehicle body; and
a seal part provided between the attachment stay and the vehicle body, wherein
the seal part includes:
  a plate-shaped seal main body formed to correspond to the attachment surface; and
  a lip part formed in an annular shape along an outer peripheral portion of the seal main body and formed to protrude from the seal main body toward the vehicle body, and
wherein the lip part includes at least two flexion parts between a base end, which is a portion of the lip part connected to the seal main body, and a distal end of the lip part, and the flexion parts are formed over the entire circumference of the lip part, and
the lip part includes:
  a first extended part having a first flexion part formed at the base end and extending from the first flexion part outward in a radial direction of the lip part; and
  a second extended part extending from a distal end of the first extended part via a second flexion part inward in the radial direction of the lip part.

2. The door mirror according to claim 1, wherein
a ridge part protruding toward the vehicle body along an outer peripheral edge of the attachment surface is provided, and
the base end of the lip part is disposed at a position facing the ridge part.

3. The door mirror according to claim 1, wherein
the seal main body includes an annular stay mounting part protruding from the seal main body toward a side opposite to the lip part to cover an outer peripheral surface of the attachment surface, and
the base end of the lip part is disposed close to the stay mounting part.

* * * * *